United States Patent
Hansen et al.

(10) Patent No.: US 9,720,964 B1
(45) Date of Patent: Aug. 1, 2017

(54) METHODS FOR ENHANCING SEARCH USING A SOCIAL NETWORK

(71) Applicants: Scott B Hansen, Jupiter, FL (US); Andrew S Hansen, Bountiful, UT (US)

(72) Inventors: Scott B Hansen, Jupiter, FL (US); Andrew S Hansen, Bountiful, UT (US)

(*) Notice: Subject to any disclaimer, the term of this patent is extended or adjusted under 35 U.S.C. 154(b) by 304 days.

(21) Appl. No.: 14/187,219

(22) Filed: Feb. 21, 2014

Related U.S. Application Data

(60) Provisional application No. 61/767,790, filed on Feb. 21, 2013.

(51) Int. Cl.
*G06F 17/30* (2006.01)

(52) U.S. Cl.
CPC .............. *G06F 17/30442* (2013.01)

(58) Field of Classification Search
None
See application file for complete search history.

(56) References Cited

U.S. PATENT DOCUMENTS

| | | |
|---|---|---|
| 8,121,999 B2 | 2/2012 | Hansen |
| 8,185,558 B1 | 5/2012 | Narayanan |
| 2006/0106788 A1 | 5/2006 | Forrest |
| 2009/0164929 A1 | 6/2009 | Chen |
| 2009/0307205 A1 | 12/2009 | Churchill |
| 2009/0327282 A1 | 12/2009 | Wittig |
| 2010/0057772 A1 | 3/2010 | Manolescu |
| 2011/0106895 A1 | 5/2011 | Ventilla |
| 2011/0252011 A1 | 10/2011 | Morris |
| 2011/0289011 A1* | 11/2011 | Hull ................. G06Q 10/107 705/319 |
| 2013/0055089 A1* | 2/2013 | Gundotra ............ G06Q 10/00 715/733 |
| 2014/0067782 A1 | 3/2014 | Waupotitsch |
| 2015/0324428 A1* | 11/2015 | Crichton ........... G06F 17/30528 707/722 |

OTHER PUBLICATIONS

Woodill, Gary, "From Semantic Search to Social Search using Mobile Devices", Retrieved at <<http://floatlearning.com/2011/09/from-semantic-search-to-social-search-using-mobile-devices/>>, Nov. 30, 2015, 3 pages.

Hughes, Nick, The Future of Social Search: Wajam Was Devised on This Napkin, retrieved at <<http://www.businessinsider.com/the-future-of-social-search-wajam-was-devised-on-this-napkin-2011-8>>, Aug. 8, 2011, 4 pages.

Topsy Labs, "Topsy Labs Announces Realtime Social Search Engine for Mobile Devices," retrieved at << http://www.marketwired.com/press-release/topsy-labs-announces-realtime-social-search-engine-for-mobile-devices-1598016.htm>>, Dec. 13, 2011, 2 pages.

* cited by examiner

*Primary Examiner* — Jay Morrison

(57) ABSTRACT

Methods for enhancing search results includes providing a search result including a plurality of search result items and posting the search result items or a link thereto to a social network cite.

20 Claims, 11 Drawing Sheets

METHODS FOR ENHANCING SEARCH USING A SOCIAL NETWORK

CROSS-REFERENCE TO RELATED APPLICATIONS

This application claims the benefit of U.S. Patent Application Ser. No. 61/767,790, filed Feb. 21, 2013, which is hereby incorporated herein by reference.

BACKGROUND

1. Field of the Invention

The present invention relates to computer-implemented methods for enhancing search results using a social network.

2. Related Technology

A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. A social networking system, such as a social networking website, enables its users to interact with it and with each other through the system.

The social networking system may create and store a record, often referred to as a user profile, in connection with the user. The user profile may include a user's demographic information, communication channel information, and personal interests. The social networking system may also create and store a record of a user's relationship with other users in the social networking system (e.g., social graph), as well as provide services (e.g., wall-posts, photo-sharing, or instant messaging) to facilitate social interaction between users in the social networking system. The social networking system may also create and store user preferences.

A social networking system may support application programming interfaces and associated functionality that allows third-party systems to access user profile data of its users. Such third party websites can use the user profile data can use the identity and account of a user for purposes of identifying users and maintaining their accounts at such third party websites. These third party websites may also access user profile data in order to personalize or customize the user experience on the site.

DRAWINGS

FIG. 1 describes a computing network

DETAILED DESCRIPTION

Figure 1:
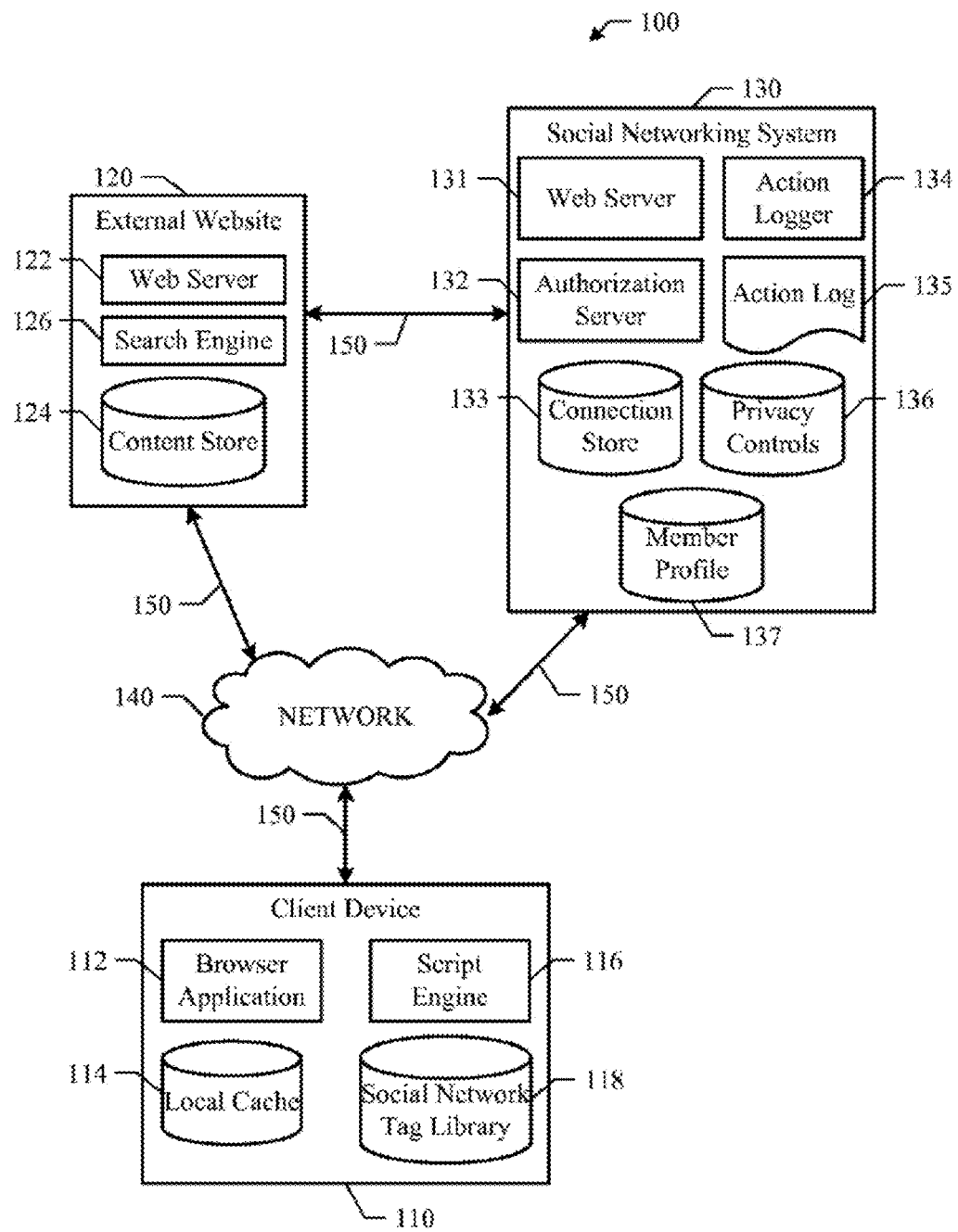

The present invention relates to using a social network to improve search in a computer-implemented method. In one embodiment, a computer-implemented method for enhancing a computer generated search result includes: (i) Receiving from a search request user a search query for performing a computer-implemented search, the search query including a search term. The search request user has a social network account that allows the social network user to form relationships by invitation with other social network users and to share social network data on the social network through the relationships; (ii) Searching a database using the search term to produce a search result including a plurality of search result items; and (iii) Distributing the search query, the search result, and/or a link to the search query to other social network users through the social network.

In another embodiment of the invention, the search result including the search result items is received by a social network and distributed to other social network users having a relationship with the search request user. The method includes (i) providing a search request user with a social network account that allows the search request user to form relationships by invitation with other social network users and to share social network data on the social network through the relationships, (ii) receiving a search result associated with the search request user, the search result including a plurality of ranked search result items; and (iii) causing the search result to be viewable by the other social network users.

The method can also include causing each of the search result items to be displayed with a respective social network input element. The social network input element allows other social network users to provide input associated with a particular search result item. For example, the search result may include a like button, comment box, or rating (e.g., star rating) associated with individual search result items, which enables the other social network users to indicate a selection or his or her likes. The social network input element can be received through a link displayed on the social network. The user selects the link to input the variable or types a comment in a box that is then received at a server.

The input from the one or more social network users can be displayed to the search request user or displayed amongst the other social network users. Displaying the input from a particular other social network users amongst the remainder of the other social network users enhances the number of social network users that view and comment on the request. The search request can be spread virally by causing the search to be redisplayed when friends or other social network users make comments or enhance the search with feedback or modifications to the search query or supplying additional search result content (i.e., adding an item to the search result).

In some embodiments, the search result, a link to the search result, and/or user feedback (i.e., input from other social network users) may be posted to the wall or newsfeed of the search request user or his or her social network friends. Posting and reposting comments to the posting can facilitate increasing the number of users that contribute to commenting on the search query and/or further refine the search result.

Providing the search result to social network users and then allowing social network users to provide input on the search result allows a social network user to create a "survey" and "answers" to the survey without having to type in the survey answers. The addition of the input element to the user interface allows other social network users to easily "answer" the "survey," thereby "voting" on the survey. The survey results may be tabulated and displayed to social network users.

In some embodiments, the search result can be displayed dynamically. In a dynamic display of the search result, the search result changes as other social network users provide input or feedback. The change in the social network may be a change in the content or the order of the search results. For example, search result items that are liked by a greater number of people can be moved up in the search result list and the change reflected across all or a portion of the social network.

In some embodiments the search result remains private. For example, the post may be viewable by others in the social network according to permission rules associated with the account of the social network user that provided the input. For example, the post may be a nonpublic post to friends on Facebook, Pinterest, Google Circles, or social networks having similar social network functionality.

The methods herein can use any search engine to search any type of data to generate the search result. The search may be a web-based search (e.g., Google Search), a search in an online commerce store (e.g., Amazon search), or a search of social network data (e.g., Facebook Graph Search, LinkedIn search, or a Pinterest search). Preferably the search engine uses an index of the World Wide Web or a database of items containing at least 50,000 items. Advertisements may be displayed with the search query, search result, and/or the link thereto and/or to comments associated with friend feedback. The advertisement may also be contextually related to the search result (e.g., contextually related to keywords in the search query or to search result items posted by the search request user or selected or identified by social network users commenting on the search result).

The methods described herein may include all or a portion of the following components: (i) providing a social network, (ii) performing a search, (iii) distributing the search query and/or search result through the social network, and (iv) and associating advertisements with the search results.

Providing a Social Network

A social networking system, such as a social networking website, enables its users to interact with it, and with each other, through the system. Typically, to become a registered user of a social networking system, an entity, either human or non-human, registers for an account with the social networking system. Thereafter, the registered user may login to the social networking system via an account by providing credentials, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile," in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Andrew and Scott are both users and connect with each another, Andrew and Scott are each connections of the other. If, on the other hand, Marcus wishes to connect to Andrew to view Andrew's posted content items, but Andrew does not choose to connect to Marcus, a one-way connection may be formed where Andrew is Marcus's connection, but Marcus is not Andrew's connection. In this case, Andrew may view Marcus's social network content, but not vice versa. While some one way connections may be formed, at least a portion of the connections are two-way connections and at least a portion of the relationships are formed by invitation (i.e., one party asks for a relationship and the other party agrees, which causes formation of the relationship in the computer implemented social network. In some embodiments the social network includes at least 10,000; 100,000; 1 million, or 10 million users with at least one relationship formed by invitation.

Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph. Additional information on edge generation in an integrated social graph is described in U.S. patent application Ser. No. 12/763,145, which is hereby incorporated herein by reference.

Similar to user profile pages, concept profile pages ("hubs") share information related to the concept associated with the corresponding hub node. In particular embodiments, any registered user logged in to social networking system and viewing a hub may add content to the hub similar to a wiki-site. A hub may also generally include a basic information section, a detailed info section, as well as, potentially, other sections, any and all of which may generally be filled in by any user viewing the hub. In particular embodiments, wall (or news feed/activities feed) section, or other feed or activities section of the hub, displays comments, status updates, wall posts and other user activities associated with the user and friends of the user that are viewing the hub. The wall (or news feed/activities feed) section, or other feed or activities section of the hub may also display comments, status updates, wall posts and other user activities and user generated content that are related to the concept for which the hub was created. A hub may also include a photo or picture section under photos tab allowing users to upload images in or related to the concept, one of which may be selected as a profile picture for the hub. The hub may also display search results received from a search request user.

In particular embodiments, user nodes and hub nodes stored in the social graph database may be connected with one another via edges. In particular embodiments, each edge may be classified or characterized by an edge type of a plurality of edge types that define, indicate, or characterize the connection between the pair of nodes connected by the edge. In particular embodiments, edges define friendship or other social relationship connections between users (e.g., friends) associated with the respective user nodes.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information (i.e., permission rules). A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

FIG. 1 illustrates a particular embodiment of a system that includes a client device 110, an external website 120, and a social networking system 130. In particular embodiments, links 150 illustrate interactions between client device 110 and external website 120, between client device 110 and social networking system 130, and between external website 120 and social networking system 130.

Client device 110 is generally a computer or computing device including functionality for communicating over a computer network (e.g., remotely). Client device 110 may be a desktop computer, laptop computer, personal digital assistant (PDA), in- or out-of-car navigation system, smart phone or other cellular or mobile phone, or mobile gaming device, among other suitable mobile computing devices. Client device 110 may execute one or more client applications, such as a web browser (e.g., Microsoft Windows Internet Explorer, Mozilla Firefox, Apple Safari, Google Chrome, and Opera, etc.), to access and view content over a computer network.

In particular embodiments, client device 110 may host a browser application 112 or other application that processes structured documents. In particular embodiments, client device 110 may have received one or more structured documents from external website 120 and/or social networking system 130. In particular embodiments, the structured document may be a markup language document that contains text, links, scripts, and other attributes, such as API calls identifying social network data elements of a user profile maintained by social networking system 130. In particular embodiments, the structured document may contain instructions, for example, to specify how to render content for display at client device 110. In particular embodiments, the structured document may contain instructions, for example, on how to access additional information from social networking system 130. Alternatively, the instructions within structured document may contain program logic interpreted by a scripting engine 116 on the client device 110.

In particular embodiments, browser application 112 may process the markup language in the structured document and render the structured document as a displayable web page. In particular embodiments, the displayable web page may include content of the external website 120 as well as one or more of the located social network data elements of the social networking system 130. In particular embodiments, browser application 112 may display the rendered web page on a display of client device 110. For example, a structured document hosted by external website 120 may contain an API call for a profile picture of a user. The browser application 112, when processing the structured document, may transmit a request to social networking system 130 to retrieve the user's profile picture. The request may be an HTTP request and may further include a browser cookie with information identifying the user of social networking system 130. The browser cookie may include state and other information indicating the status of the user, for example, whether the user has recently logged in and/or authenticated to the social networking system 130. Still further, the structured document provided by external website 120 may include a segment (such as a div or iframe) that prompts the user to log in to social network system 130. For example, the structured document may include HTML code, Javascript and other controls that cause the browser hosted by client device 110 to access social networking system 130 and render a login interface in a section of the displayed structured document.

In particular embodiments, external website 120 may be any website accessible on the Internet, and may have various formats, such as, for example and without limitation, text, audio, video, images, web pages, documents, executables, etc. In particular embodiments may be computer-implemented tool for locating desired information throughout the internet, such as search engine 126. Some of the most common search engines are search engines provided by Microsoft™. Inc. (http://www.bing.com), Yahoo™ Inc. (http://search.yahoo.com), and Google™ Inc. (http://www.google.com). In particular embodiments, external website 120 and its contents may be stored at many different sites, such as on computers and servers, in databases, etc., around the world, as illustrated by content store 124. In particular embodiments, the information that search engine 126 seeks to locate may be in content store 124, on social networking system 130, or on many different sites, such as on computers and servers, in databases, etc., around the world as well. These different sites are communicatively linked to the Internet through various network infrastructures and the Uniform Resource Locator (URL) of external website 120 specifies where the corresponding documents are located and the mechanism for retrieving them. Any person may access the publicly available external website 120 or its contents via a suitable network device (e.g., a computer, a smart mobile telephone, etc.) connected to the Internet.

In particular embodiments external website 120 and social networking system 130 may have one or more users or members. In particular embodiments, users of external website 120 may also be users of social networking system 130. In particular embodiments, a user may interact with external website 120 and/or the social networking system 130 using client device 110. In particular embodiments, the social networking system 130 may keep user profile information and the connections among the users.

In particular embodiments, the social networking system 130 may receive requests from either the external website 120 or the client device 110 to which the social networking system 130 may respond with the requested information or with a subset of the requested information. Particular interactions between client device 110, the external website 120, and the social networking system 130 and information exchanged between the three systems will be described later in detail. Some embodiments of the invention may be carried out on just the social networking system 130, the client device 110, or the external website 120 or may be carried o using any combination of these elements and/or in a combination that uses more than one of each of these elements (e.g., two or more social networking systems or two or more external websites 120). As discussed in more detail below, implementations of the invention include enhanced search results from posting a search result, a search query, or a link to a search result in a social network so as to obtain social network views and/or feedback regarding the search result post.

In particular embodiments, social networking system 130 may include a web server 131, an authorization server 132, an action logger 134, an action log 135, a connection database 133, a privacy controls database 136, and member profile database 137. In particular embodiments, social networking system 130 may include additional, fewer, or different modules for various applications. Conventional components such as network interfaces, security mechanisms, load balancers, failover servers, management and network operations consoles, and the like are not shown so as to not obscure the details of the system. In particular embodiments, the social networking system 130 comprises a computing system that allows users to communicate or otherwise interact with each other and access content as described herein.

In particular embodiments, the social networking system 130 stores user profile data and social graph information in member profile database 137. In particular embodiments, the social networking system 130 stores data describing one or more connections between different users in the connection database 133. Particular embodiments of the connection database 133 may store connection information for users who have indicated similar or common work experience, group memberships, hobbies, or educational history. In particular embodiments, the social networking system 130 may also include user-defined connections between different users and those connections may be stored in connection database 133 as well. Particular embodiments of connection database 135 may allow users to specify their relationships with other users. In particular embodiments, for example, these user defined connections allows users to generate relationships with other users that parallel the users' real-life relationships, such as friends, relatives, co-workers, partners, and so forth. In particular embodiments, users may select from predefined types of connections, or define their own connection types, as needed.

In particular embodiments, the web server 131 links the social networking system 130 via the network 140 to one or more client devices 110. Network 140 generally represents a network or collection of networks (such as the Internet or a corporate intranet, or a combination of both) over which client devices 110 may access the external website 120 and the social network system 130. In particular embodiments, the web server 131 serves web pages, as well as other web-related content, such as Java, Flash, XML, and so forth. Particular embodiments of the web server 131 may include a mail server or other messaging functionality for receiving and routing messages between the social networking system 131 and the client devices 110. In particular embodiments, the messages may be instant messages, queued messages (e.g., email), text and SMS messages, or any other suitable messaging technique.

In particular embodiments, the action logger 134 is capable of receiving communications from the web server 131 about user actions on and/or off the social networking system 130. In particular embodiments, the action logger 134 populates the action log 135 with information about user actions in order to track them. More specifically, any action that a particular user takes with respect to another user is associated with each user's profile through information maintained in a database or other data repository, such as the action log 135. In particular embodiments, the actions taken by the members that are recorded in the action log 135 may be actions taken by the members on the social networking system 130 or actions taken by the members on the external website 120. In particular embodiments, the actions taken by the members on an external website 120 are communicated to the web server 131 and the web server 131 sends a request to the action logger 134 to record the actions in the action log 135. In particular embodiments, such actions may include, for example, adding a connection to the other user, sending a message to the other user, reading a message from the other user, viewing content associated with the other user, attending an event posted by another user, among others. Additionally, in particular embodiments, actions in connection with other objects may be directed at particular users, and these actions may be associated with those users as well.

In particular embodiments, when a user takes an action on the social networking system 130, the action is recorded in an action log 135. In particular embodiments, the social networking system 130 maintains the action log 135 as a database of entries. In particular embodiments, when an action is taken on the social networking system 130, the social networking system 130 adds an entry for that action to the action log 135.

In particular embodiments, a user of the social networking system may share media hosted by external websites with the social networking system and this action may be received by action logger 134 and stored in action log 135. In particular embodiments, external websites may have "share" buttons that are operative to transmit links to the content to the social networking system and post the links as wall post entries for a user profile. In particular embodiments, the buttons are operative to transmit activity stream entries to the social networking system, which will post the entry in a news feed. In particular embodiments, for example, a user can access a photo, a photo album, a video clip, or other media from a client device 110 and post links to that content on the wall associated with a user profile on social networking system.

In particular embodiments, privacy controls database 136 may store a user's privacy data for a user's settings for each user datum associated with the user and the user's settings for third party applications. For example, a user may have selected default privacy settings or a user may have specifically excluded certain entities from viewing a user datum or particular type of user data, and all of that privacy data for all users and friends of users may be stored in the privacy controls database 136.

In particular embodiments, a user's privacy data may comprise privacy settings associated with any aspect of the user profile, including changes that the user makes to the user profile, events, locations, media, activities, connections between one or more users, the news feed associated with the user or any other action that the user takes in the social networking system. In particular embodiments, the privacy settings associated with the privacy controls database 136 may be provided and stored at different levels of granularity. In particular embodiments, for example, the information to be shared may be specific information, such as, work phone number, or a set of related information, such as, personal information including several pieces of related information including profile photo, home phone number, and status. Alternatively, in particular embodiments, the privacy settings associated with the privacy controls database 136 may apply to all the information associated with the user in the social networking system. In particular embodiments, the specification of the set of entities that may access particular user information may also be specified at various levels of granularity. In particular embodiments, the user may specify any number of entities with which information may be shared. In particular embodiments, sets of entities with which information may be shared may include, for example, specified friends of the user, all friends of the user, all friends of friends, all applications, and all external systems. In particular embodiments, for example, the user may provide a list of external systems that may access certain information as well.

In particular embodiments, may specify a set of entities that includes exceptions that are not allowed to access the user's information. In particular embodiments, for example, the user of the social networking system may allow all external systems to access the user's work information but specify a list of external systems that are not allowed to access the work information. In particular embodiments, the list of exceptions that are not allowed to access certain information of the user may be a "block list." In particular embodiments, external systems belonging to a block list specified by a user of the social networking system are blocked from accessing the information specified in the privacy setting stored in privacy controls database 136. Particular embodiments contemplate various combinations of granularity of permitted access or denial of access depending on the type of user information and sets of entities with which information may be shared or accessed by the sets of entities, as specified by the user and stored in the privacy controls database 136.

In particular embodiments, the authorization server 132 enforces the privacy settings of the users of the social networking system, such as described above with respect to the privacy policy. In particular embodiments, the privacy setting of a user determines how particular information associated with a user may be shared. In particular embodiments, as described above, the privacy controls database 136 comprises the privacy data for a user's settings for each user datum associated with the user and the user's settings for third party applications. More specifically, the privacy data for a user's settings may specify particular information associated with a user and the entity or entities with whom the information may be shared. In particular embodiments, the entities with which information may be shared, may include users, third party applications, external websites, or any other entity that can potentially access the information. In particular embodiments, the information that may be shared by a user may comprise any aspect of the user profile, events, locations, media, activities, or the news feed associated with a particular social network user. Unless otherwise specified, this information is referred to herein as "social network content" or "social network data."

For purposes of this invention, social network information derived from social network content is referred to as social network analytics. The social network analytics are data that derive patterns or additional information from the social network content and are therefore not provided by the social network users.

Performing a Search

In some embodiments of the invention a social network user performs a search. The social network user performing the search is referred to herein as the search request user. The search request user provides terms to be used in a particular search (i.e., the search query). The search query is performed using a computer-implemented search engine and can be performed through the client device 110, an external website 120, or a social networking system 130.

A search engine is a computer-implemented tool designed to search for information relevant to specific subject matters or topics on a network, such as a social network, the Internet, the World Wide Web, or an Intranet. To conduct a search, a network user may issue a search query to the search engine. The search query generally contains one or more terms (words or phrases) that describe a subject or concept of interest. In response, the search engine may identify one or more network resources (i.e., social network data or web content) that are likely to be related to the search query, which may collectively be referred to as a "search result" identified for the search query. The search result includes a plurality of network resources (i.e., a plurality of search result items) which are usually ranked and presented to the network user according to their respective degrees of relevance to the search query.

In some embodiments a web browser is used to access a webpage (or other structured document) for rendering at a client device. A web browser application is generally a computer program configured to run on a user's computing device (e.g., client device 110) that enables the user to connect to various server-hosted webpages available over a network. A non-exhaustive set of common web browsers include, by way of example, Chrome™ and Safari™. The web browser provides a standard viewing window that displays the informational and visual content of the webpage or website (the term "website" and "webpage" may be used interchangeably herein where appropriate). In particular embodiments, the browser processes the structured document and creates an in-memory representation of the document. The representation may be a Document Object Model (DOM) representation of the webpage. The web browser then renders the page in the particular client viewing window of the browser utilizing the DOM (or other suitable) representation.

Particular embodiments relate to a plug-in software application (hereinafter referred to as "social browser extension") that operates or executes in the context of a browser (e.g., a web browser) or other application client that consumes structured documents. In other implementations, the functionality described herein can be incorporated directly into a browser client application, as opposed to being a plug-in. In particular embodiments, the identity of a first user is known to the browser or plug-in through the plug-in itself or through the use of a connect application and the like.

Particular embodiments access, at a client device, a set of search results embodied in a structured document loaded into a client application (such as a browser client), wherein the search results correspond to a search query of the search request user. Sophisticated search engines implement many other functionalities in addition to identifying relevant network resources as a part of the search process. For example, a search engine usually ranks the network resources identified for a search query according to their relative degrees of relevance with respect to the search query, such that the network resources that are relatively more relevant to the search query are ranked higher and are presented to the network user before the network resources that are relatively less relevant to the search query. The search engine may also provide a short summary of each of the identified network resources.

The network resources used in the search (i.e., the data set used in the search) may be public social network data, private social network data, public non-social network data (e.g., web data), or private non-social network data. In some embodiments it may be desirable to search data that is non-social network data, social network data, or a combination. The percentage of the database being searched (as measured by number of search terms) that is private social network data is less than or equal to 50%, 40%, 30% 25%, 20%, 15%, 10%, 5%, 1%, or 0.1%, or greater than or equal to 50%, 40%, 30% 25%, 20%, 15%, 10%, 5%, 1%, or 0.1% or a range thereof In some embodiments, the percentage of the database (as measured by number of search terms) that is public, non-social network data is less than or equal to 50%, 40%, 30% 25%, 20%, 15%, 10%, 5%, 1%, or 0.1%, or greater than or equal to 50%, 40%, 30% 25%, 20%, 15%, 10%, 5%, 1%, or 0.1% or a range thereof. The network data may be stored and searched in the form of a keyword index.

The search may be performed through an external website 120 (e.g., a web search such as a Google search). In yet another embodiment, the search can be performed by on a social network (e.g., Facebook Graph Search, Yelp search). The data may be stored and searched on the client device 110. The search engines and social networks that can be used in the present invention include any websites that have a search box and any social network to which information can be posted by social network users. Examples of search engines and social networks include Google, Amazon, eBay, Facebook, Tumblr, Pinterest, Linkedin, Yelp, Foursquare, Apple iTunes, Pandora.

Figure 2:
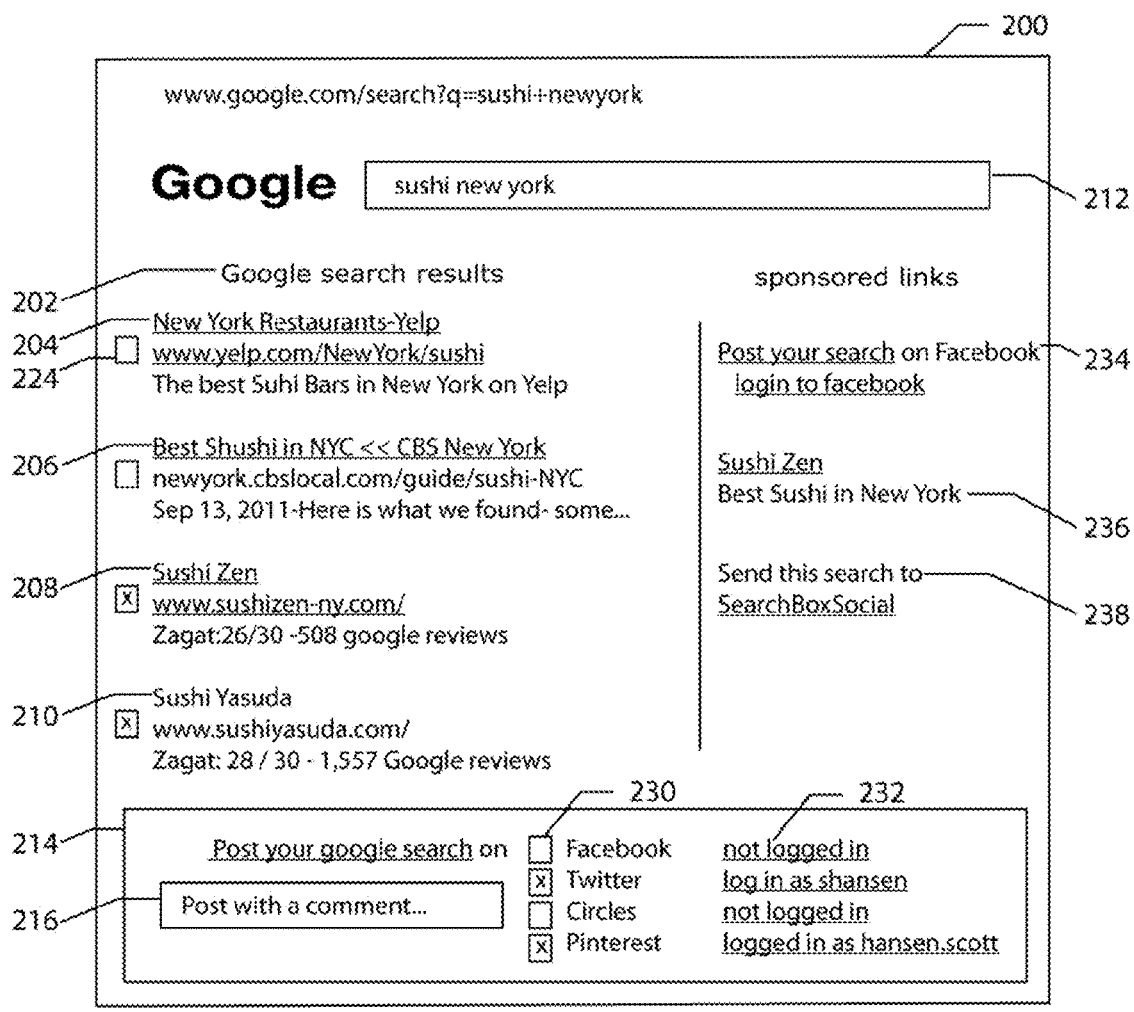
FIG. 2 shows a search result from Yelp posted to a Facebook account.

FIG. 2 illustrates an example search page 200 displaying a search result 202 for a search for "sushi new york". Search page 200 includes a search box 212 where a search request user enters the search term. The search term may be a single word or a word phrase. In some embodiments, the search term is fewer than or equal to 10, 7, 5, or 3 words. In this case, the search request user has entered the search term, "sushi new york" and submitted the request to a web search engine (in this case Google search available at www.google.com). The web search returns a search result including four search result items 204, 206, 208, and 210 (i.e., network resources. Note that only four search result items are illustrated in order to simplify the discussion. In practice, a search result may identify hundreds, thousands, or even millions of network resources. Typically only a portion of the search result items from the search result are displayed on a search result page. The search result can be scrolled to view search result items further down the list. The scrolling may be accomplished using a scroll bar or touch gesture on a touch sensitive device.

Figure 3:
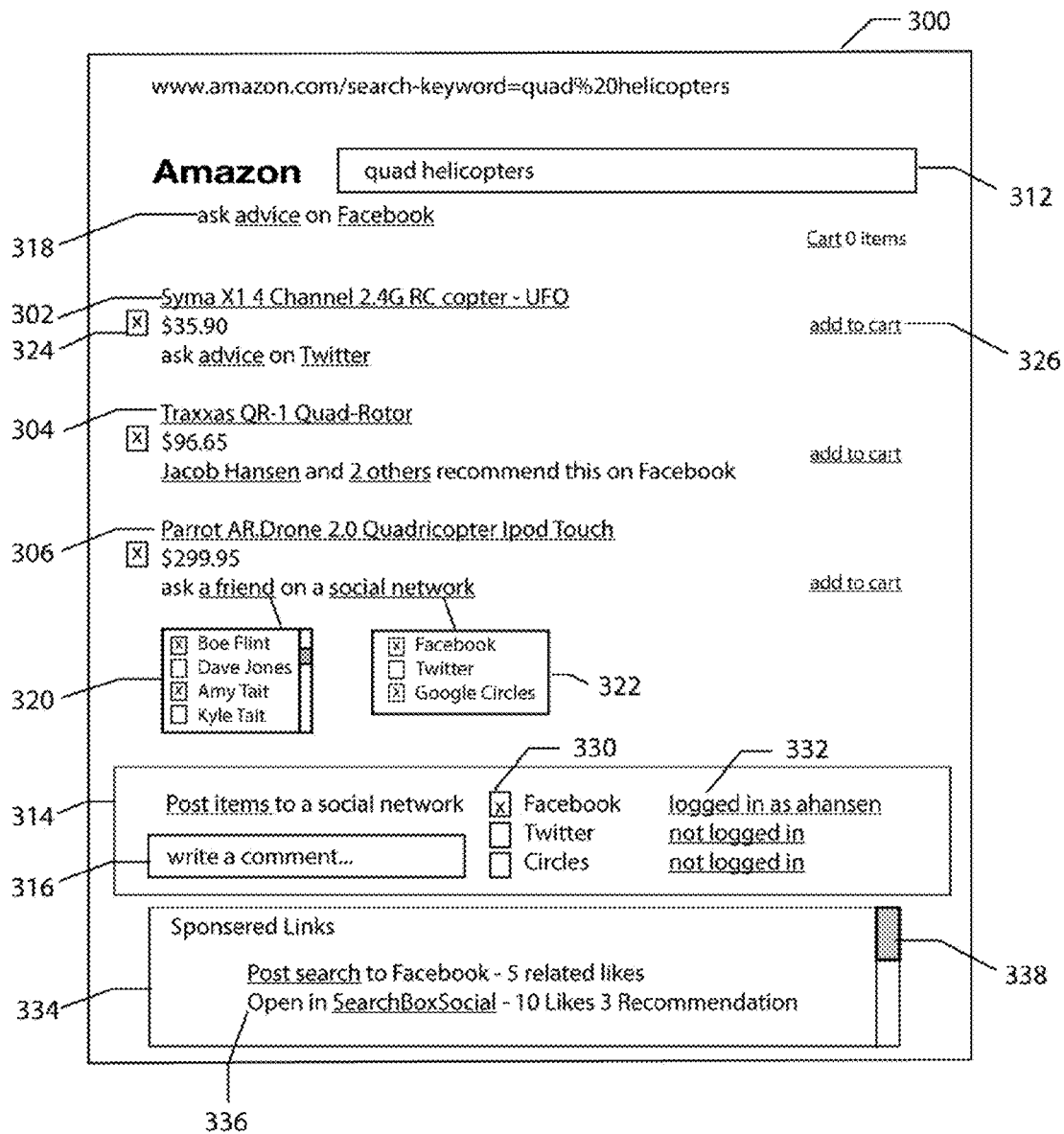
FIG. 3 shows comments posted on a social network where the comments are related to the search result shown in FIG. 2.

FIG. 3 illustrates another search page 300 showing a keyword search performed on an e-commerce website (Amazon). The search request user has entered the search term "quad helicopters" and received a search result with three search result items 302, 304, and 306.

In particular embodiments, example search page 200 or 300 may span one or more structured documents, wherein each structured document may include a subset of the search results. The first structured document returned to the user generally includes the highest-ranking search results. A structured document or webpage, which may itself include multiple embedded resources, may include data records, such as content plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Cascading Style Sheet (CSS), and, frequently, Java.

As illustrated in search page 200, network resources 204, 206, 208, and 210 each includes a title, a short summary that briefly describes the respective network resource, and a clickable link in the form of a URL. In particular embodiments, for example, network resource 208 is a web page provided by Yelp that contains information concerning New York Restaurants. The URL of this particular web page is "www.yelp.com/NewYork/sushi."

Search result items 302 may also provide a clickable link in the form of a URL to a further description of a consumer good and/or allow the search request user to purchase the good. The search result item may also include a price of the consumer good identified in the search result item.

Search result items may also include social network input elements for receiving feedback from social network users, as described in more detail below.

Distributing the Search Query and/or Search Result Through the Social Network

The search result is typically distributed through the social network by causing the search query, the search result, and/or a link to the search query to be displayed on the social network in association with the search request user's social network account. The search result is viewable by at least a portion of the other social network users on the social network or by selecting the link. The distributed search result may include plain textual information, or more complex digitally encoded multimedia content, such as software programs or other code objects, graphics, images, audio signals, videos, and so forth The particular social network users that receive the search result or the link can be established according to the rules of the social network. For example, the search result or the link can be distributed to those people who have a particular type of relationship with the search request user, such as a friend relationship. The search query, search result, or link thereto can be displayed as a wall post in a news feed, on a tweet, in a message or any other medium of communication authorized through the search request user's social network account. (i.e., the search result or link thereto may be distributed through established communication mechanisms of the social network.

In some embodiments the search request user may be invited to post the search results on a social network. FIGS. 2 and 3 illustrate search pages that invite the social network user to distribute the search result to a social network. Search page 200 includes an invitation 214 to post the search result. Invitation 214 includes the text, "post your Google search." The invitation 214 can include a selectable URL that upon being selected causes the search page to generate a structured document to be transmitted to a social network. The document may include the result items 204, 206, 208, and 210 or a link to a web page that includes the search result.

The invitation 214 can include a list of social networks that the search request user can select from for posting the search result, search query, and/or link thereto. A check box next to each social network allows the user to select which social networks to post the search result. In this embodiment, the social network list includes four social networks, Facebook, Twitter, Circles, and Pinterest. A check (indicating selection of that social network) is placed next to Twitter and Pinterest. Posting the search request causes the server hosting search page 200 to send a structured document to Twitter and/or Pinterest.

When a structured document is sent to more than one social network the structured document may be the same or different. For example a first document may be sent to Twitter that includes a hyperlink to a web page with the search results but not display the search results (since Twitter doesn't provide enough space to post a typical search result). A second document may be generated that will post a search result with all the search items on Pinterest. Thus, the documents sent are formatted for the particular social network to which the search or link is to be transmitted.

A server computer that generates the search page (e.g., search page 200 or search page 300) can have access to or otherwise store account information for accessing social network accounts of particular search request users. As illustrated in FIG. 2, search page 200 shows login status for Facebook, Twitter, Circles, and Pinterest. In this case, the search request user is logged into Twitter and Pinterest, but not Facebook or Circles. The login status is indicated by text (e.g., text 232). The text may include a URL that allows the user to select the link and provide the login and password information for the Facebook account. Those skilled in the art will recognize that any functionality that grants access to a particular social network account can be used to allow a search request user to be identified and send the structured to document in a format that can be received by a social network user and distributed to a plurality of other social network users having a relationship with the search request user.

In some embodiments, the server hosting search page 200 may have account settings where the account login information for a plurality of different social network accounts are stored. FIG. 3 illustrates text that indicates whether a user is logged into a particular social network and/or provides a link for logging into a social network. For example, text 332 shows social network user Andrew as having provided access to the "ahansen" Facebook account.

Invitation 214 includes a text box 216 to which the search request user may post a comment or question to be displayed with the search result or link. For example a search request user may enter a phrase like, "Which sushi restaurant should I go to?". The question or comment may be displayed with the search result as describe more fully below.

The search request user can be invited to send the search results to particular friends or particular social networks. For example, as illustrated in FIG. 3, text 318 says, "ask advice on Facebook". A URL associated with this text can cause a structured document to be sent to Facebook for posting. In another embodiment, selectable text can produce a list of friends to which the search results can be sent. For example first selection box 320 provides a scroll list of friends that can be selected or not selected for sending the search results. A second selection box 322 allows the user to select the social network to post the search results to. The search results can be posted to a friend's social network site by causing a server computer to send a structured document to the search request user's social network account and posting the information in a location that other social network users will have access to, such as the user's wall.

In one embodiment first selection box 320 is populated with a friend list by obtaining a friend list from the search request user's social network account. In some embodiments, the friends listed in the first selection box are populated with a combination of friends from friend lists available through two or more different friend lists, such as Facebook and Google Circles as shown as selected in second selection box 322.

Any of the lists of items displayed on a search result page can be displayed in a scrollable window. For example, sponsored links 334 in FIG. 3 can include a side bar 338 for scrolling through multiple sponsored links. In addition the search result or friends list, or social network list may all be displayed as scrollable lists. The scrolling can be performed using a mouse or by using a touch screen and moving a finger across the display.

Sending the search results to the social network may be governed by the relationships established in the social network. Thus, the search result or link thereto will be sent to some members of the social network, but not all. This limits the number of posts seen by particular individuals to those who are likely going to care to see the post and/or respond to it. The post may be public or may be private. Private posts are only displayed to individuals who have access through the social network (i.e., the post may be uploaded to the social network as private social network data). The number of social network users that receive the search result may be greater than or equal to 2, 3, 10, or 50 and less than or equal to 10,000, 1,000, 500, 100, or 50, or within a range thereof.

The search result post may also be sent to friends of friends according to permission rules and privacy settings set by the social network, the social network users, and/or the search request user. When posting the search result to friends of friends, the name of the search request user may be identified or concealed according to permission rules or privacy settings.

The document sent to the social network may also include the search query and the search query may be displayed to the social network user, either alone or in combination with the search result or a link to the search result. The name of the search request user or the name of another social network user commenting on the search result or the link thereto may also be associated with the search result and/or the link thereto. Associating the name with the search query, search result, or link provides a compelling reason for certain other individuals in the social network to view and/or comment on the post. This attention to the post is important since the number of people that will see the post is relatively limited (in contrast to a typical web search which collects similar search results for millions of individuals).

The post of the search result and/or the document used to generate the post of the search result or the link thereto, may also identify the search engine used to perform the search. For example, FIGS. 4 and 6, which identify Yelp and Amazon, respectively as the search engines for performing the search.

The search result or the link to the search result may also be displayed with an input element. The input element allows users to provide feedback associated with the post of the search result, including the individual search result items (e.g., vote on the search result items or provide comments). Input elements include, like, dislikes, ratings (e.g., star rating), recommendations, text comments, etc. The input elements may be associated with the search result or the search query or both. The input element may also be displayed on the social network or a web paged linked to from the social network. The input elements may be associated with the particular social network user that provided the input elements and/or be posted to the social network alone or in combination with the search result. The input element may also be used to modify the search result by changing the ranking or adding or deleting search result items or performing other types of modifications. The input elements and/or the modifications to the search query or search result may be displayed to the search request user and/or other social network users (display of the input elements to social network users constitutes "feedback"). The display, transmission, and/or storage of the input elements/feedback and/or modifications to the search result may be public or private and may follow permission rules associated with the social network (e.g., privacy settings).

The modifications or input elements/feedback may be dynamic. Where the modifications or input elements/feedback are dynamic, the search result post may change in real-time as the user input is received at the server computer. In another embodiment, the post may be static. In this embodiment, user input may be collected and the modifications or feedback to the search result can be displayed as an additional post.

Preferably the input elements and/or modifications are displayed on a social network or accessible through a link posted on a social network. Input elements can be associated with an entire search page, the search result, or individual search result items. Input elements may be associated with the particular social network user that provided the input. Input elements may also be stored in a relational database. The relational database may include the name of the user providing the input in association with the search result or search result items. In a future search the search engine can use this data to improve the search results.

Figure 4:
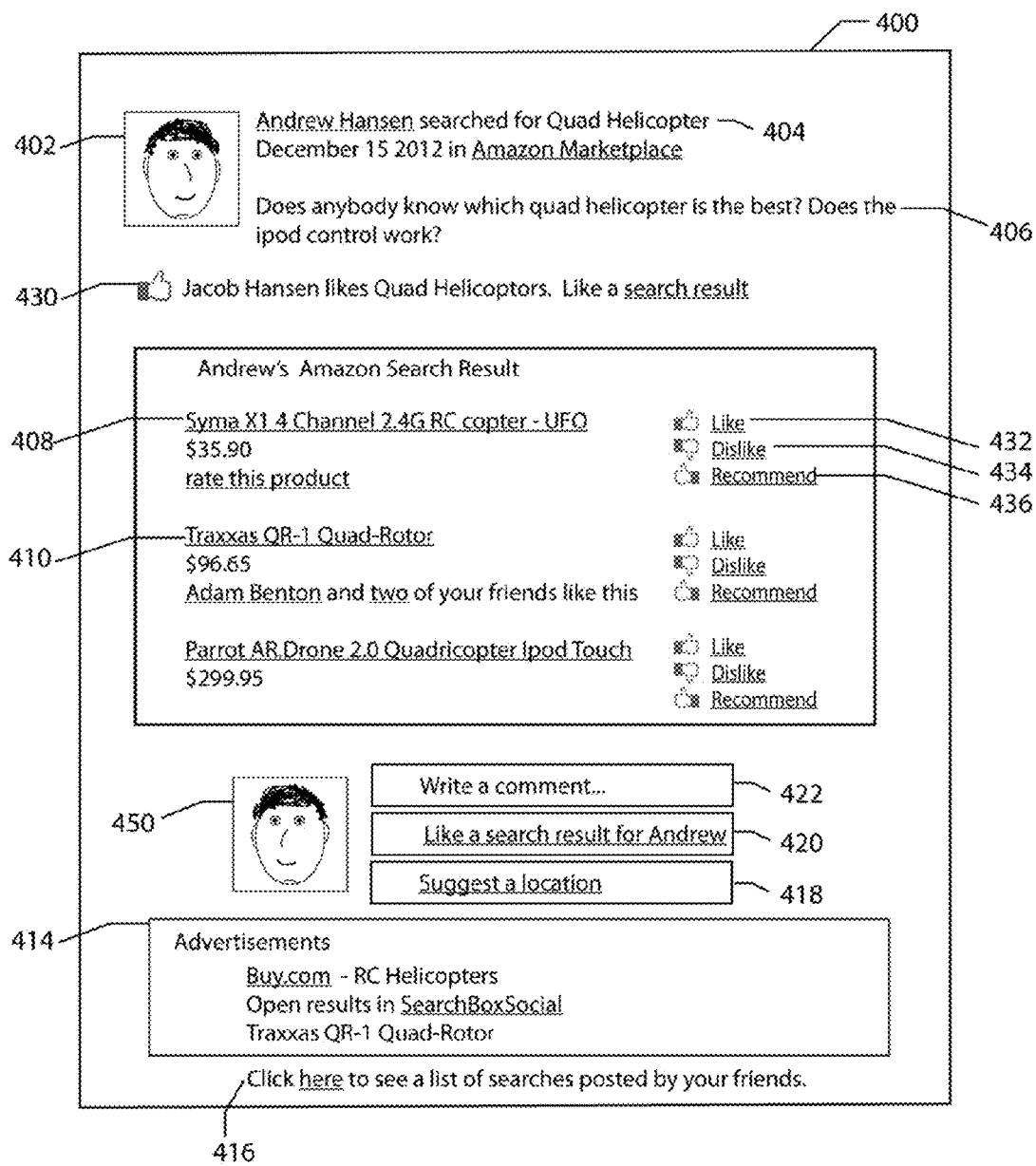
FIG. 4 illustrates a web search engine that allows users to post the search result to the user's social network.

FIG. 4 illustrates a search result page 400 posted on a social network. Search result page 400 displays the search result of FIG. 3 in response to a request from social network user Andrew. The search result may be communicated from an external web-site 120 over network 150 and received by a social network system 130. The social network system 130 can receive the search result in the form of a document (e.g., written in HTML). The search result including search result items 408, 410, and 412 are posted to Andrew Hansen's social network profile or otherwise associated with Andrew's social network account. For example, search result page 400 may be a post to Andrew's "wall" on the social network. The search result page may include a post 402 with information identifying Andrew as having searched on Amazon and listing the search query (text 404).

The search result may also include input elements such as "like" button 432, "dislike button 434, and/or "recommend" button 436. The input buttons may be associated with individual search result items (i.e., each search result item has input elements). Alternatively, input elements may be associated with the entire search result. For example, comments from social network user Scott (450) can be input into a comment box 422 or a like request 420. Input element 418 allows social network user to suggest a new search result (e.g., a new location for purchasing items). The location may be an e-commerce site or an actual physical location. The new search may be contextually related to the search query or search request provided by the search request user. The contextually related search and/or a contextually related search result and/or a link thereto may be displayed to social network users and/or posted to a social network for viewing and/or comment.

The search result page 400 can include an advertisement or links to other websites as indicated in advertisement section 414 of search result page 400.

In some embodiments, the search queries entered by the social network users are stored over time and made available for viewing or searching. For example, text 416 invites social network users to view a list of previous searches posted by other social network friends.

As mentioned above, in some embodiments, the search result is distributed through a social network via a link to the search result. The link out of the social network (i.e., the social network used for distribution) can be to another social network or to an external web page, or an application running on a client device. The social network user selecting the link (i.e., responding social network user) causes a document to be opened on an external web page, or causes an application to open, either of which displays the search result. The content to be displayed can be transferred to the distribution social network in the same document with the link or can be stored or communicated to the server that will display the document using a different document or system than the distribution social network.

Figure 5:
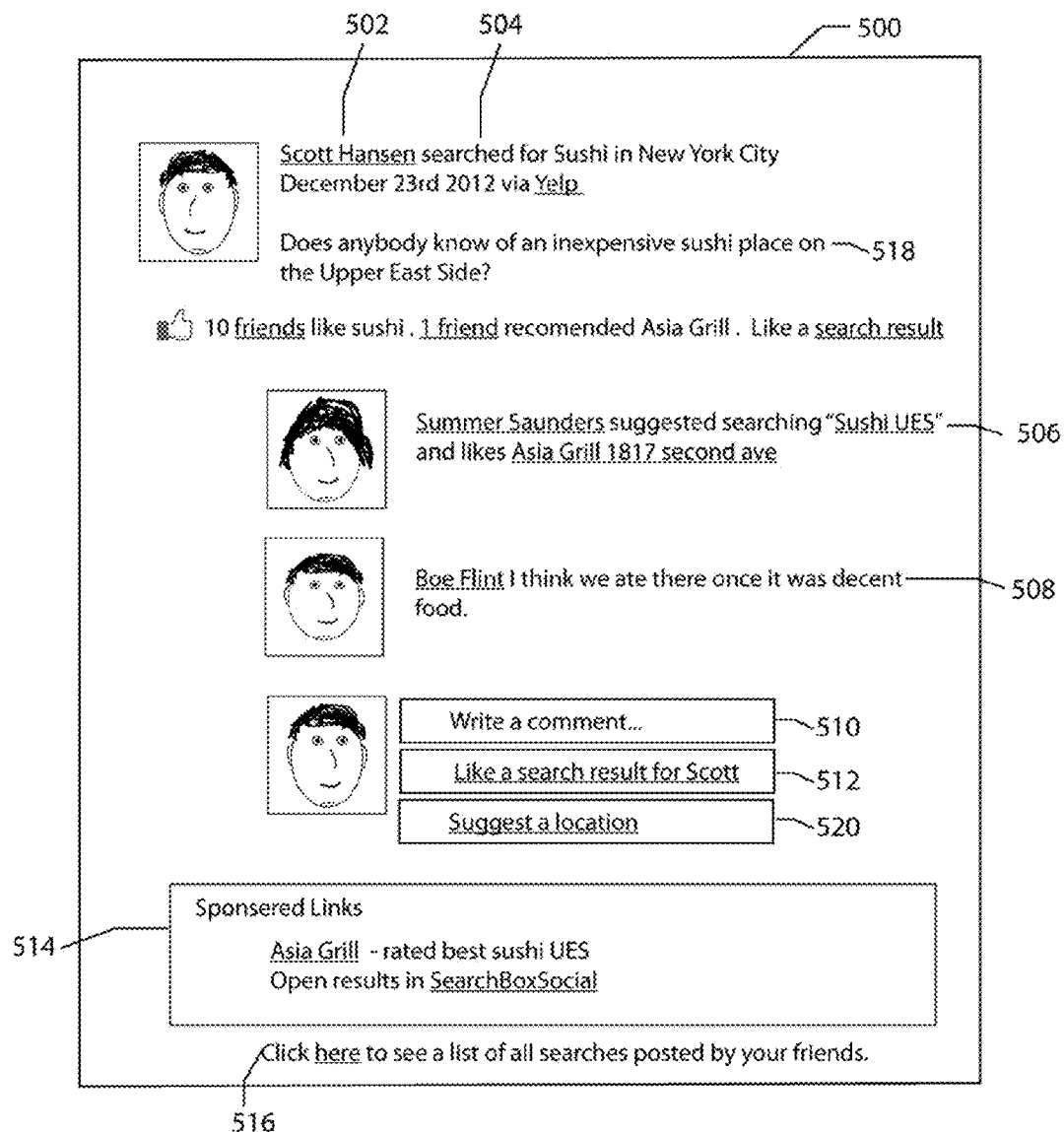
FIG. 5 illustrates a search on an electronic commerce website where the search user can post the search results to the user's social network.
Figure 6:
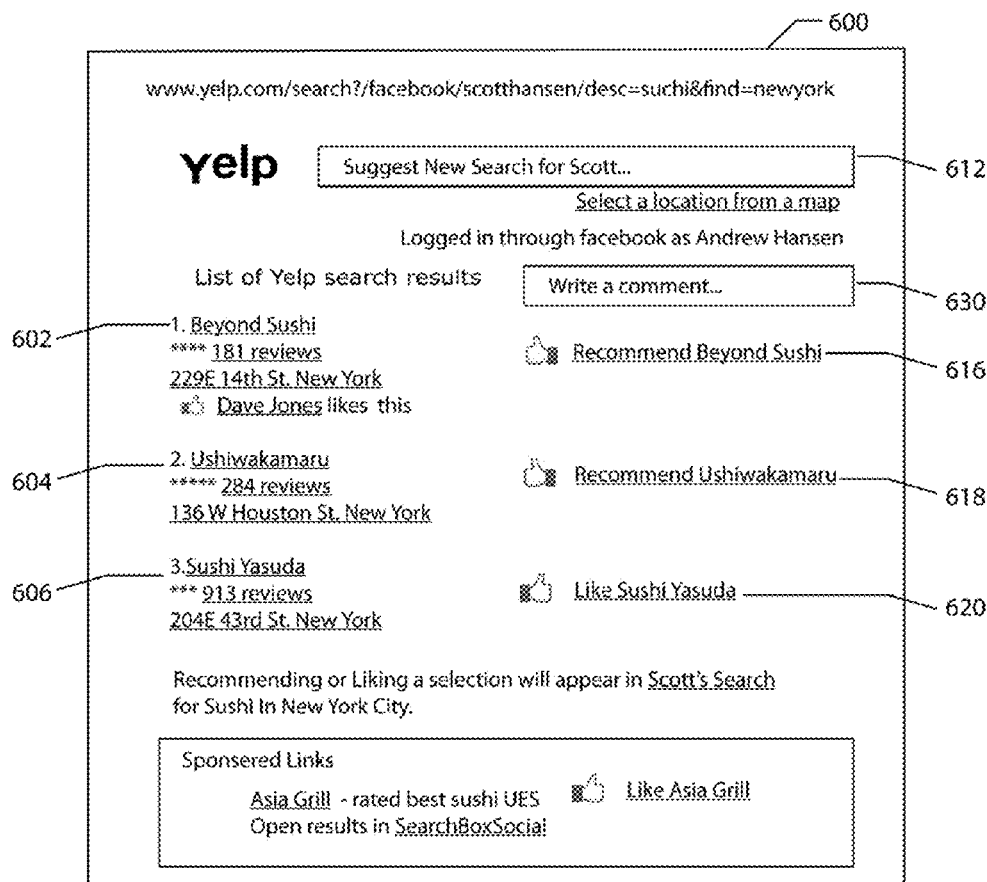
FIG. 6 shows a computer implemented application that allows users to view searches posted by social network friends.

FIG. 5 illustrates a post 502 on a social network that provides a link 504 to a website called "Yelp". FIG. 6 shows the search result that is displayed when selecting link 504 in post 502. With reference to FIG. 5, news feed 500 is a feature of a social network account viewable by social network user Andrew. In this specific example, Scott has searched for "Sushi in New York" using his mobile device running a dedicate application for searching Yelp. In response to a search query for "Sushi in New York", the Yelp application produced a document that delivered post 502 to Scott's social network account and the post 502 is shown in Andrew's newsfeed 500 via the social network. Post 502 reads "Scott Hansen searched for Sushi in New York City Dec. 23, 2012 via Yelp." The post includes a URL that will take Andrew (i.e., a social network friend) to the Yelp website to view the search result.

FIG. 6 shows a search result page 600 that is displayed to Andrew by selecting the link in post 502. Search result page 600 displays search result items 604, 606, and 608. Social network user Andrew can view the search result items and provide input. Search result page allows Andrew to recommend one or more of the search result items via input elements 616, 618, and 620. Items 604, 606, and 608 may be ranked according to relevancy and the search result may include many more search result items that can be viewable by scrolling or other suitable navigation feature.

Social network user Andrew can suggest a new search by typing in a search term in search box 612. The search terms entered into search box 612 may be contextually related to the search query and/or search result provided by the search request user. Thus, the search by the responding social network user may produce a contextually related search result.

A social network user responding to the search request user's post and/or search result may provide input and the input may be posted to a social network and viewable by other social network users. For example, FIG. 5 shows a post 506 by social network user "Summer Saunders." To create this post Summer selected link 504 and viewed search page 600 and entered a new search "Sushi UES" in search box 612. The search result was modified based on the updated search query. The updated search result included "Asia Grill 1817" and Summer "liked" the search result item. The social network input was then transmitted to the social network and posted as post 506. Other social network users can view Summer's post 506, which encourages other social network users to participate in the social network dialogue. For example, "Boe Flint" makes post 508, which is a comment on Summer's post 506. Andrew is invited to make comments using input elements 510 and 512.

In some embodiments, a search result page and/or a search result may include an input element 520 with a selectable link for inputting a location. For example, selecting input element 520 can cause a map input element to be displayed. Map inputs are described in more detail below with regard to FIG. 9. Suggested locations provided through link 520 may be posted to a social network to further enhance input regarding the location.

Those skilled in the art will recognize that the foregoing embodiment is not limited to links in a newsfeed post. Links can be used in a short message such as a tweet, in the search request user's wall, etc.

Figure 7:
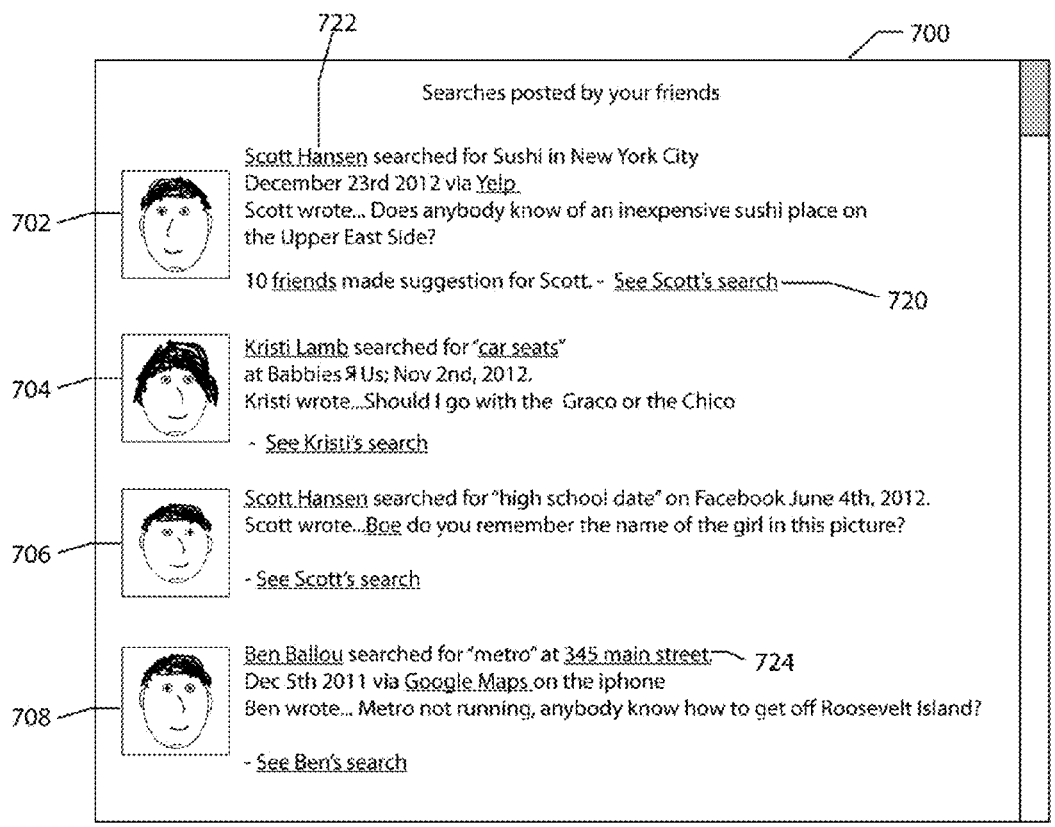
FIG. 7 shows example social network posts.

FIG. 7 illustrates various types of social network posts that can be generated by social network users to enhance or otherwise provide valuable information related to a search query. Post 702 illustrates a post related to a yelp search. Post 702 includes an invitation 720 to see Scott's search result. The invitation 720 includes a URL associated with the text. This link directs users to search results for a yelp search, as described above. Posts 704, 706, and 708 include similar links to a search result that was performed by the search request user. Ten friends have made suggestions for Scott, which can be viewed by selecting the link associated with invitation 720. In some embodiments, the text associated with a post may include a link to social network information. For instance, text 722 can provide a link to Scott Hansen's social network profile hope page.

Post 704 by social network user "Kristi Lamb" indicates that Kristi searched for car seats at "Babbies R Us." The post for Babbiers R Us includes graphics that are different than plain text. In particular, the Babbies R Us has a backwards "R" which is a logo for Babbiers R Us. In one embodiment, a logo is embedded in the search result and an advertiser is charged a fee for enhancing the search result with the logo. Note that the logo may not change the ranking of the search result item; it merely enhances its aesthetic appearance and/or builds brand recognition. This feature (i.e., enhancement of search result items using logos or graphics) can be carried out on search results for tradition web-page searches (e.g., Google searches), although enhancing search results posted to a social network or link thereto are a preferred method.

The social network comments or posts related to the search result can greatly enhance a search. For example, post 706 relates to a search for information that may be available through a social network. In post 706, social network user Scott is looking for information associated with a picture stored on a social network. Among a sufficiently large number of social network users viewing the search request, there is likely to be someone that knows the where the data can be found and/or can provide a more targeted search to find the data. Posting the query or search request in combination with an invitation to other social network users to provide a response can greatly facilitate receiving information that may answer a question associated with the query. Suggestions that answer the search query can be stored in a database and used in future searches related to the search result item.

Post 708 is a post by a social network user "Ben Ballou" who is searching for map direction. The search result may provide a map of where the social network user was at the time the post was made or provide current location in real time. For instance, the search engine may use the real time location data from a GPS in a mobile device to pinpoint the search request user's current location 724. The search request may be associated with a question and posted to a social network to receive input from other social network users. The input from the other social network users may be displayed to the search request user and/or may be stored in a database and used in future searches to improve map search results. In some embodiments, a map may be displayed with the search result. Additional details regarding a search result that includes maps are provided below with regard to FIG. 9.

In some of the embodiments described herein (e.g., search queries shown in FIG. 7) the invention does not require that the search result be displayed to social network user. In these embodiments, it may be sufficient to display the search query and a request by the social network user for information.

Unless otherwise specified, the term "causing to display" generally means sending a document or link, or computer executable instruction that results in the search result or the link to the search result to be displayed. The search result may be displayed on any device that can access the content of the social network (i.e., social network users). The access may be through a dedicated app on a client device or through a website.

In one embodiment the search results are displayed dynamically. In a dynamic display, the search results are modified in real time as social network users provide input about the search result items and input is used to rank the search result and any change in the search result is distributed to the locations viewing the search result.

While the preferred embodiments described herein relate to using a web-search to provide the query and search result items to the social network, in some embodiments, the search result items may be provided by the a social network user in other ways. For example, the user may identify images or text to be associated with the search query and the identified image or text may serve as a search result item to be associated with a search query and displayed to other social network users in combination with input elements.

Search Application

The present invention may also be carried out using computer software executed on a primary server computer that provides a user interface for receiving a search query from a search request user and then causes a search to be performed on a third party website or social network server and/or retrieves the search result or communicates the search result to a social network. In addition, the primary server computer may cause the search result or the link thereto to be transmitted or displayed on a third party social network with one or more links that when selected provide feedback information (e.g., responses to input elements) to the primary server computer. Thus, the primary server may provide a centralized computer server for causing the search to be carried out, posting the search result and/or a link to a search result, and/or receiving feedback from the search request users. In some embodiments, the primary server computer may be a server associated with an external website 120 or may be a social network system 130.

In order to coordinate the distribution of the search result to the social network and/or view social network data, the primary server computer may require establishing an account with the search request user and/or the other social network users. The account can be established using a user name and password. In some embodiments, the primary server computer may request and receive account information for logging into a social network, thereby obtaining access to the user's social network.

The primary server computer may provide a user interface for social network users to perform computer implemented searches. In particular, the primary server may receive a search query from a search request user. The search query may be formed into a document and communicated with a web server hosting a search engine. The search engine produces a search result and the search result may be received by the primary server. The search result may be displayed to the user on a client accessing the primary server. The primary server computer may also prepare a structured document that includes the search result or a link thereto. For example, the link may be a link back to the primary server computer. The search result and/or the link thereto may include other links that identify selections of search result items and/or provide feedback that is directed back to the primary server through the link. For example, the server computer can send a structured document to the social network that includes input elements. Feedback generated from users selecting links on the social network (e.g., the search result or other items associated with the link) may be received by the primary server computer and displayed to the search request user and/or other social network users connected to the search request user (e.g., via accounts for the other social network users, which are established on the primary server).

Figure 8A:
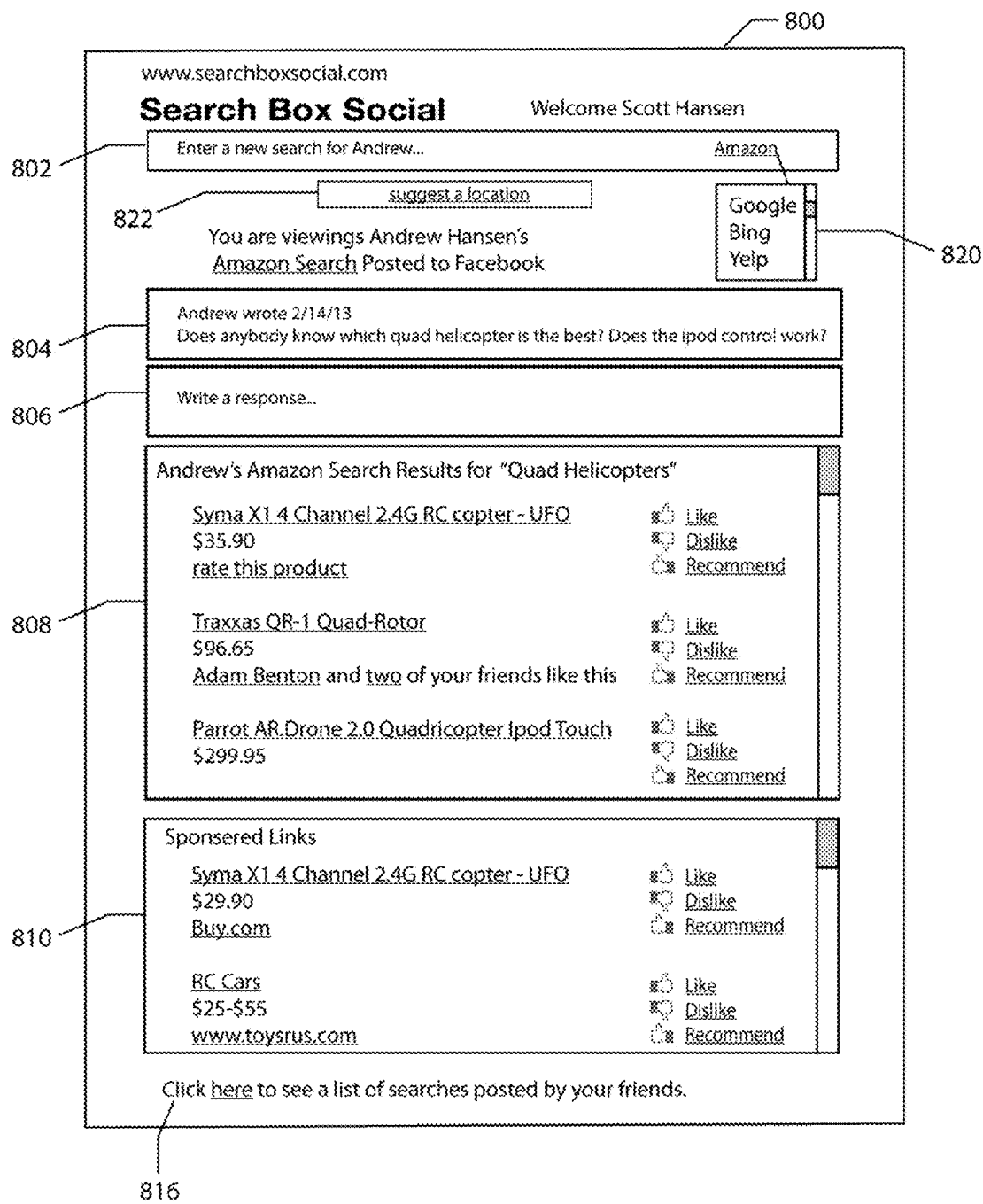
FIG. 8A illustrates a system for performing search queries and displaying a search result.

FIG. 8A describes, a search result page 800 that utilizes a primary server for receiving and viewing a search result received from a third party search engine server and/or distributes the search result on a third party social network site. In this case, an e-commerce website (Amazon) is used to perform the search and a private social network (Facebook) is used to distribute the search query, search result, or link thereto.

Search result page 800 is a user interface that includes a search box 802 for receiving a search query. The search page allows the user to select a search engine for performing a search. In some embodiments, a drop down menu 820 includes a plurality of different third party search engines that a user can select from for performing a search. Drop down menu 820 may include a button (e.g., a selectable "+") for adding additional search engines to the list. The addition of a search engine may be added by typing in the URL of the website that has a search box associated with a search engine. Such search boxes are typical of websites (e.g., www.gap.com or www.homedepot.com). Search box 802 may be used for suggesting modifications to search results received from other social network users or may be used to perform initial searches, which may be distributed through the social network or may be viewed without distributing to a social network.

Search result page 800 may also include post 804, which provides the post made on a social network. For example, in this case, post 804 was a post made on Andrew's Facebook account, which is connected to Scott Hansen's Facebook account. A selectable link on Scott's Facebook page allows the user Scott to select the link and open search result page 800 and cause display of post 804 and search result 808. Advertisements 810 may also be displayed with search result 808. Advertisement 810 may be contextually related to search result 808.

Search result 808 may include input elements for "liking" "disliking" or "recommending" particular search result items. In an alternative embodiment, or in addition, the input elements may be associated with search result 808 as a whole. Other input elements that may be used include ratings (e.g., star ratings) or comment boxes, which may be associated with the search result or the search result items. Search result 808 shows various input elements and feedback that can be associated with a search result. For example, the text "rate this product" is associated with the search result item "Syma X1". A URL may be associated with "rate this product" that allows a social network user to receive a window where the user may rate the product. The rating system can be a star rating, a numerical rating, or any other type of rating. The rating, likes, dislikes, or recommendations may be used to update the search. For example, result item Traxxas" includes the text, "Adam Benton and two of your friends like this." This text includes feedback from social network connection Adam and two other friends who received a distribution of the search result and in response to receiving the distributed search selected a link that allowed them to provide input that is then displayed to Scott. The same results may be displayed to Andrew in the hypothetical "SearchBox Social" application or on a different social network, such as Facebook available at www.facebook.com. While post 808 shows only shows feedback associated with the "Traxxas" search result item, those skilled in the art will recognize that feedback, if received, can be associated with any or all the search result items.

Comment box 806 invites users to write a response to questions posted in post 804. Responses posted in box 806 may be distributed to a social network, including a third party social network or a social network hosted on the primary server (in this case illustrated as SearchBox Social and hypothetically available at www.searchboxsocial.com).

In addition, feedback received from other social network users in response to viewing the search result can be used to modify the search result with regard to ranking. For example, items that receive positive feedback from other social network users may be used to move items up in the search result list and negative feedback can be used to move items down in a search result list. Positive feedback may include likes or recommendations, or particular ratings. Negative feedback may include dislikes. An inference of negative feedback may be implied from the lack of likes or recommendations.

Feedback from social network users may be stored in a database in association with the item rated and the data may be used in future searches that involve the item to assist in ranking the item. Particular social network data associated with the social network users providing the feedback may also be associated with the feedback in the relational database and used to determine the relevancy of the feedback for other social network users whose search results yield the same item. For example, the likes, dislikes, age, gender, occupation, etc of a particular social network user providing feedback may be used to infer relevancy of the feedback to another social network user whose search results yield the same item.

The search result data from previous searches can be used in searches by social network users connected to or not connected to the social network user providing the feedback or otherwise generating the search result data. Where a search result uses data from the relational database the identity of the particular social network user may be concealed. For example, if 200 social network users rate a product high and 100 rate the product low, this feedback can be provided to a social network searcher performing a search that returns the particular product, but the identity of the particular social network users that made the rating can be concealed or preferably only those social network users who have a connection and/or permission to view social network data of the particular user providing the feedback may view specific details of the feedback. Where a search user does not have a connection, the data may be provided in aggregated form. Examples of databases storing personal information is described in Applicant's U.S. Application No. 61/543,811, filed Dec. 18, 2008 and Ser. No. 12/653,923, filed Dec. 19, 2009, and Ser. No. 12/683,411 filed Jan. 6, 2010, all of which are hereby incorporated herein by reference.

The search results from various search request users may be stored on the primary server and made available to the same or different search request user and/or the other social network users. For example text 816 on search result page 808 provides a link to view past searches. Preferably, the ability to view search results may be determined according to social network rules. For example, social network users and/or search request users who have a connection (e.g., are friends on the social network) may view each other's searches and the feedback associated therewith. Thus, in some embodiments the searches are stored as private social network data (e.g., stored in association with a social network profile) and made viewable (i.e., handled) according to the permission rules of the social network. Preferably the social network user providing the search query and/or feedback has control of the permission rules of the social network and can modify the permission rules to allow or disallow other social network users from viewing the social network content they provided.

In some embodiments, a primary server running a search application may require an account for accessing data on primary server and the account may be distinct from an account associated with the social network server used to distribute the search result (i.e., primary server and the social network server are provided by two different social networking systems 130). In some embodiments, the account on the primary server may use the same account credentials as the social network account used to distribute the search query, search result, or the link thereto.

In some embodiments, the search may be performed on an activity-based database. The activity-based database includes activities associated with locations and/or associated with particular social network members (i.e., the activities and/or locations of the activities are provided and/or derived from social network users and/or social network data). In one embodiment, the search results include activities that are identified with words that are the participle form of speech (e.g., present participle).

Posting Search Requests and Search Boxes in Social Networks

In yet another embodiment, the invention may include posting a search request and a search box or a link thereto to a social network for other social network users to view and act on. The search request may be in the form of a question requesting information or suggestions related to any item of interest to a user, including internet content, images, or textual inquires. The search request may be accompanied with a search box. The search box may be an active search box into which responding social network users may enter a search query that is contextually related to the search request (such social network users are referred to herein as responding social network users). Alternatively, the search box may be an icon, logo, or other image, or text that has an associated link (e.g., a URL) that takes the user to a different and/or external page for entering the search query. The search box icon, logo, or text indicates to the user the ability to perform a search by selecting the icon, logo, or text. Upon selecting the link, the search request user can enter a search query that is contextually related to the search request (i.e., the terms in the search are related to the search request posted on the social network). The contextually related search query is searched using a search engine. The search result may include one or more search result items (preferably a plurality of search result items) that are displayed to the search request user and/or the responding social network user, and/or to other social network users having a social network relationship (i.e., connection) to the search request user and/or the responding social network user. The search result may be posted in association with the search request on the same or different social networks than the social network originating the search request.

The search engine may be hosted on a server for the social network, an external webserver, or a primary server executing a program with access to both the social network and a third party search engine. The search result can be displayed and/or posted in any manner described herein. For example, the search result may be posted with input elements, kept private or made public, posted to any number of social networks, etc.

In some embodiments, the search request can be derived from the context of a social network post. For example, a post may include an interrogatory phrase, such as a phrase that includes "how," "where," "what," "why," "when," or a phrase such as "does anyone know" or "can someone recommend" or "where can I find." These phrases indicate that a post includes a search request. Social network posts can be analyzed for interrogatories and upon identifying an interrogatory, a search box or link thereto can be associated with the post.

Posts that include an interrogatory phrase may also be analyzed for keywords that can be used in a search query. For example, a phrase such as "does anyone know of a good restaurant in Salt Lake City" includes the interrogatory phrase "does anyone know" followed by suitable search terms, "restaurant" and "Salt Lake City." Search terms derived from statements including interrogatories are referred to herein as "inferred search terms." The inferred search terms may be used in a search query with a search engine to produce a search result. The search may be a web search, which returns a list of search result items.

In addition, the inferred search terms may be used to search private and/or public social network data and return social network information that is relevant to the search request. For example, where a person inquires about sushi, the search engine can provide a list of friends that have "liked" sushi and/or provide a link to such information.

In the case where a search box is associated with the search request, the search box may use a particular search engine and/or suggest a particular search engine. The selection of the search engine may be contextually relevant. For example, if the interrogatory relates to food, the search box may default to a search engine optimized for searching restaurants (e.g., Yelp). If the interrogatory relates to a particular store (e.g., gap), the search engine may default to Gap's search engine available on its website at www.gap.com. In an alternative embodiment, the user may select the search engine in a similar manner as described with regard to FIG. 8A (e.g., drop down box 820).

In yet other embodiments, parsing a post on a social network to find interrogatories can also be used to automatically produce a search result. In this embodiment, the interrogatory is identified, the inferred search terms are identified, and a search engine is used to produce a search result based on the inferred search terms. The search result is displayed to the search request user and/or to other social network users. The automatically derived search result may include input elements as described herein for receiving feedback from other social network users.

Figure 8B:
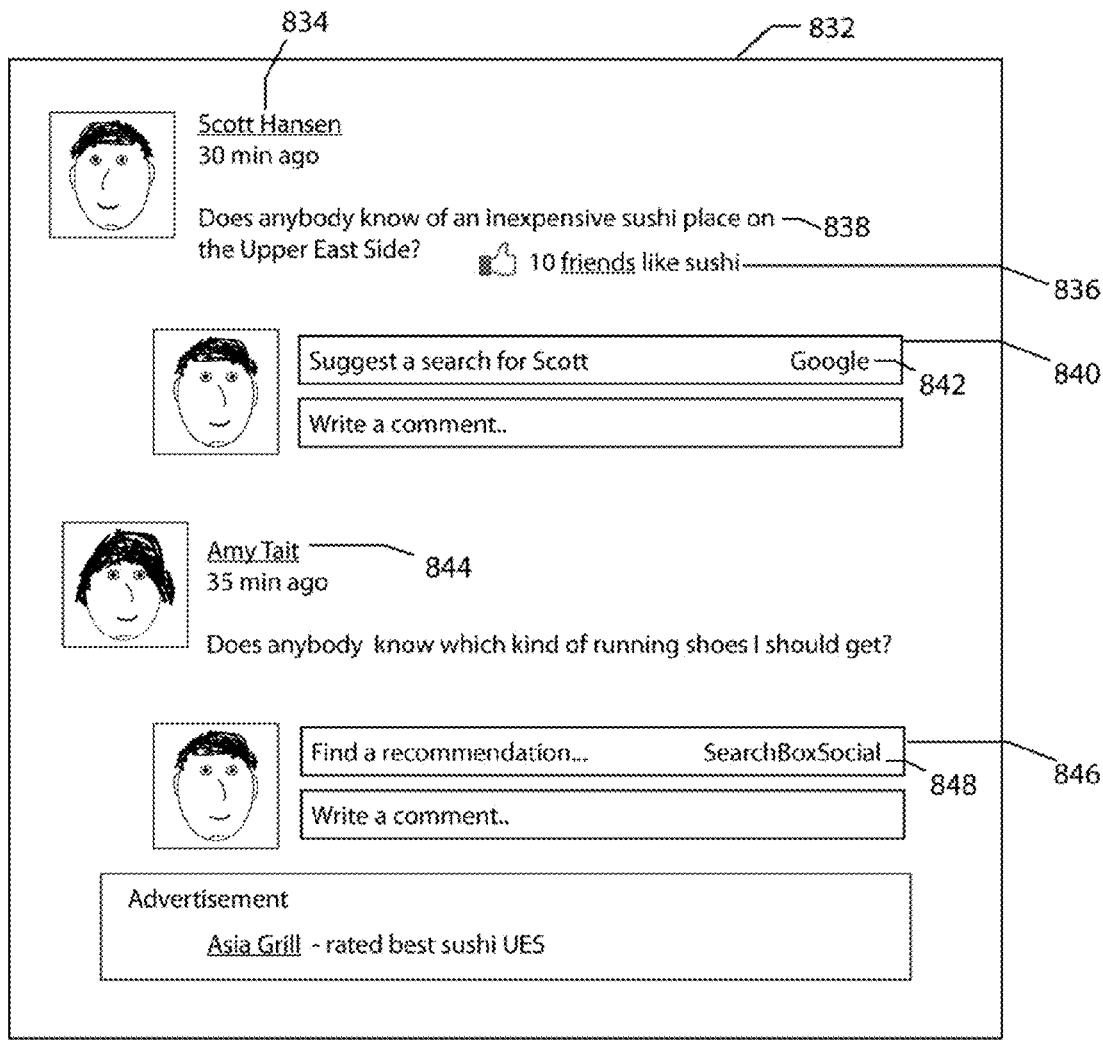
FIG. 8B shows a social network post including a search request and search box.

FIG. 8B illustrates a social network page 832 in which social network user Scott has created a social network post 834. Post 834 includes a search request 838, which states, "Does anyone know of an inexpensive sushi restaurant on the upper east side?". A search box 840 is included with post 834 and invites the social network user Andrew (who is viewing post 834) to suggest a search for Scott using a search engine 842 (e.g., Google).

Similarly, A second post 844 by Amy Tait includes a search request "Does anybody know which kind of running shoes I should get?". Search box 846 included in post 844 invites social network viewer Andrew to make a recommendation by searching a search engine 848.

Social network page 832 also includes a contextually relevant social network element 836 associated with post 834. Element 836 includes a list of friends of social network user Scott that have created social network data indicating that they like Sushi. A link is associated with element 836 such that network user Scott can see the list of friends. Contextually relevant social network elements may include links to any type of social network data including photographs, messages, product likes, etc.

FIG. 8A illustrates an example of automatically associating search boxes with interrogatories in posts of a social network. For example, posts 834 and 844 include the phrase "does anybody know," which is infers the desire for a search. Search boxes 840 and 846 may be automatically included in the post based on the presence of the interrogatory. The term "sushi" is used to infer the social network user is looking for sushi. The inferred term is used to find other social network users that like sushi.

Posting search boxes and/or search results in social networks allows social network users to easily exchange information and opinions and engage in a dialog that is difficult to perform outside a social network. By accessing the search engine or search result through the social network, other social network users can see what others are searching for and comment on the results, change the search terms, and/or express an opinion about the items in the search result. This leads to more personalized, superior information and results as compared to current search engines.

Search Results with Maps and Generating POI Data

The present invention also relates to generating search results that include maps and distributing the search query, search result, or link thereto through a social network and/or generating points of interest using feedback provided by social network users in response to a posting of a search query, search result, or link thereto. In this embodiment, a map may be displayed with the search result either on the social network or on a page reached through a link posted on the social network. The map may be caused to be displayed to social network users with a connection to the search request user. Displaying the map with the search result allows the user to select items from the map. For example, the search query may be a search for items that can be located on a map and the search result may return a plurality of locations that meet criteria for the search. The search result items may be pin drops on the map that identify POIs or may be a list of text that identifies POIs, or both.

In some embodiments, the display of the map may be in response to social network users providing feedback on a search result. For example, FIG. 8A illustrates text 822, which invites a social network user viewing a search result to "suggest a location". The "suggest a location" link may take a user to a new page for viewing a map and providing location feedback for where to buy an item or perform an activity. The location suggestion may be contextually related to the search query and/or the search results. In addition, a location suggestion made in the context of feedback may be stored in a database (e.g., relational database or non-relational database) with items in the search result.

Figure 9:
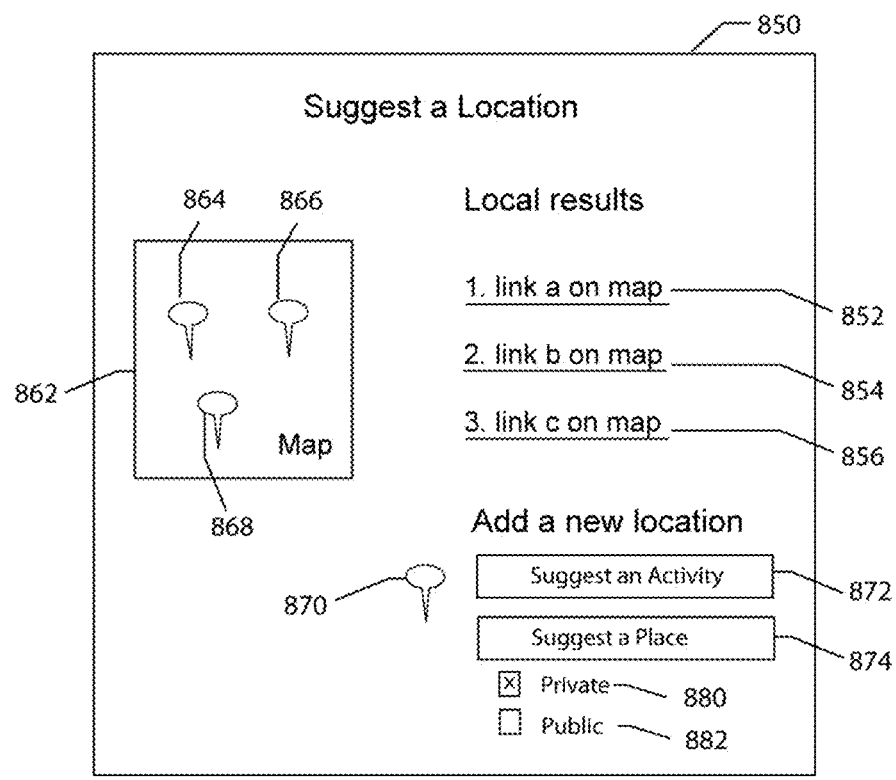
FIG. 9 illustrates a map based search posted to a social network.
Figure 10:
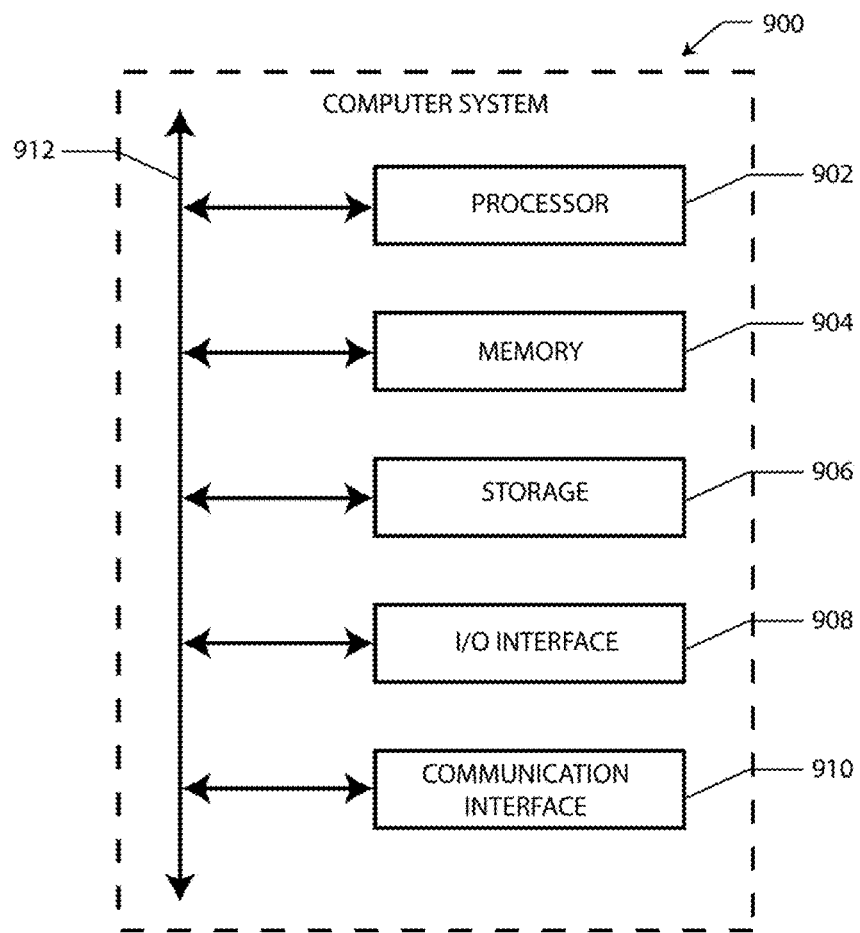
FIG. 10 illustrates an example computer system.

FIG. 9 is a schematic of a search page 850 that includes a map 862. Search page 850 may be provided to a social network user in response to a search query or search result being distributed through a social network as described herein.

Map 862 may be any type of map, including images or schematics. Map 862 may be of any scale including maps of buildings, parks, cities, counties, states, countries, or the world or any fraction thereof. The map may be 2-D or 3-D. The map may be a high-resolution image or a drawing. Preferably the map represents real-life geographic features. Examples of suitable maps that may be used in the present invention include computer implemented maps displaying US Geological Service maps, Google Maps, Apple Maps, Garmin Maps, etc. The maps may include an overlay of points of interest (POIs). The overlay of POIs may be provided by a third party map provided or may be provided by the social network.

Map 862 includes a plurality of identified POIs 864, 866, and 868. POIs 864, 866, and 868 can serve as search result items. Alternatively or in addition to marking a POI on map 862, corresponding links can be placed in a list. For example, links 852, 854, and 856 can correspond to map POIs 864, 866, and 868, respectively. Search result 852, 854 and 856 can be distributed to social network users as described herein and social network users can select one or more of links 852, 854, or 856 to leave a comment, suggestion, or recommendation.

In addition, users may also create new POIs. For example, input box 872 allows a user to input an activity that can be performed and input box 874 allows the user to give a name for the place. In some embodiments, the place name is non-descriptive of the activity. Additional details regarding forming points of interest can be found in Applicants copending applications 61/543,811; Ser. No. 12/653,923; and Ser. No. 12/683,411.

In some embodiments, the location of the POI can be added to the social network/map using a drag and drop icon. For example, pin 870 can be dragged and dropped on to map 862 to identify the location of the activity being added to map 862. Dragging and dropping pin 870 may also open a dialog box for entering information regarding the type and/or place of interest.

Although not show, search page 850 may also include a search box for performing initial map searches or for modifying a search as described above with regard to FIGS. 2-8. In addition, the search results can include a combination of map-based search result items and web-based search result items. For example, a portion of search result items 852, 854, and 856 may be links to search result items such as web pages or social network data.

FIGS. 2-9 include some text that has not been identified with reference numerals so as to avoid unnecessary clutter in the drawings. However, those skilled in the art will recognize that any text or graphics displayed on a search page may include interactive elements such as drop down menus or embedded links that can open new pages or perform functionality described herein. In addition, the pages and software running the pages may provide menu items for setting preferences and/or permission rules for any of the features described herein. The preferences or permission rules or additional menu items may be provided by an application running on client device 110, one or more external websites 120, and/or one or more social networks 130.

Advertising

When the search result, search query, and/or link to the search result is displayed on the social network (e.g. a social network web page or mobile app), a sponsored advertisement can be displayed in association therewith. The advertisement may be contextually related to the search request, the search query, search results and/or the input elements.

The advertisement may be within a post on the social network (i.e., associated on the page with the search) or displayed adjacent. The advertisement may be delivered in the same page as a search request, search query, search result, or link thereto. The advertisement may be generated by a social network provider, a search engine provider or a search provider that uses third party social networks and/or third party search engines to provide posting and searching services.

Any of the advertisements may have links associated therewith that link to other pages that provide additional details about products or services. The products or services may be contextually related to the search request, search query, search result, or input elements.

The advertisements may generate revenue from third party entities. The compensation may be calculated by number of views/presentations, number of click throughs to links, or other methods with similar functionality.

The selection of the advertisement may also use social network data, including private social network data and/or public social network data to improve the relevancy of the advertisement to the social network users. For example, gender, age, occupation, likes, dislikes, etc. can be used to weight or ranks the selection of the advertisement to be posted.

Paid or sponsored advertising may be used with any of the embodiments described herein.

Embodiments also relate to providing a particular look or enhancement to a particular search result item and charging/receiving compensation for displaying the search result item with the look or enhancement. For example, the social network post may include graphics (e.g., a logo), search result item may be displayed on the social network with a logo. The logo may be included in the post. This feature may be used in combination with posting a search result in a social network or may be used alone when displaying a traditional search result from a search engine (e.g., a web search).

A like and a recommendation can be distinguished using the mirror image of the same icon, for example a thumbs and the mirror image of a thumbs up retains the same visual indication but is distinguishable. As an example like 432 and recommendation 436 are distinguished by an icon that is a mirror image in FIG. 4.

Computer System

Particular embodiments may be implemented on one or more computer systems. FIG. 4 illustrates an example computer system 400 that may be used to implement a server. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate.

In particular embodiments, storage 906 includes mass storage for data or instructions. As an example and not by way of limitation, storage 906 may include an HDD, a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 912 may include one or more buses 912, where appropriate.

Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

We claim:

1. A computer system for conducting a survey on a social network using a computer-generated search result, comprising:
    one or more processors; and
    one or more hardware storage devices having stored thereon computer-executable instructions which are executable by the one or more processors to cause the computer system to perform at least the following:
        receiving from a search request user a search query for performing a computer implemented search, the search query including a search term,
            the search request user having a social network account that allows the search request user to form relationships by invitation with other social network users and to share social network data on the social network through the relationships;
        using the search term to generate a search result that includes a plurality of search result items;
        generating a survey comprising at least two of the search result items, each of the search result items in the survey having a social network input element associated therewith;
        in association with the social network account, displaying the survey on the social network to at least one other social network user that has a social network relationship with the search request user, thereby invoking a response to the survey from the at least one social network user;
        receiving one or more responses to the survey from the at least one other social network user, the one or more responses including input provided by the at least one other social network user through a particular social network input element of the survey; and
        displaying at least a portion of the input from the responses, or a tabulation thereof, to the search request user.

2. The system of claim 1, wherein the plurality of search result items displayed is only a portion of the search result items generated in the search result, and wherein the plurality of search result items displayed form a list, the method further comprising causing each of a plurality of the search result items in the list to be displayed with the respective associated social network input element.

3. The system of claim 1, wherein the search result items or a link thereto are displayed in an activity feed on the social network.

4. The system of claim 1, wherein the social network input element is a like button or a multi-level rating.

5. The system of claim 1, wherein the social network input element is a comment box.

6. The system of claim 1, further comprising storing in a database the input received in association with the respective search result item and optionally storing the information that identifies the social network user that provided the input.

7. The system of claim 1, comprising generating a social network post wherein the post includes the search result, a link to the search result, the response input, or a link to the response input, and associating the post with the social network user or the account of the social network user that provided the input.

8. The system of 7, wherein the post is viewable by others in the social network according to permission rules associated with the account of the social network user that provided the input.

9. The system of claim 8, wherein the post is a non-public post.

10. The system of claim 1, wherein the search result is displayed on the social network as private social network data.

11. The system of claim 1, further comprising causing an advertisement to be displayed with the search query, search result, and/or the link thereto, wherein the advertisement is contextually related to the search query and/or search result.

12. The system of claim 11, wherein the advertisement is selected at least in part on the input received from the one or more other social network users.

13. The system of claim 1, wherein the search result includes a list of ranked search result items.

14. The system of claim 13, wherein the response to the survey includes a selection of a particular search result item in the list.

15. The system of claim 14, further comprising causing text to be displayed to the at least one social network user that prompts the at least one social network user to make the selection.

16. The system of any of the foregoing claims, wherein permission rules set by the search request user authorize a first portion of the other social network users to view the search result and prevents a second portion of the other social network users from viewing the search result.

17. The system of any of the foregoing claims, wherein the search result is posted on a social network and the search result is received from a third-party search provider, wherein an advertisement is from the third-party search provider and posted with the search result and includes a selectable link associated therewith.

18. A method for conducting a survey on a social network using a computer generated search result, comprising:
- receiving from a search request user a search query for performing a computer implemented search, the search query including a search term,
  - the search request user having a social network account that allows the search request user to form relationships by invitation with other social network users and to share social network data on the social network through the relationships;
- using the search term to generate a search result that includes a plurality of search result items;
- generating a survey comprising at least two of the search result items, each of the search result items in the survey having a social network input element associated therewith;
- in association with the social network account, displaying the survey on the social network to at least one other social network user that has a social network relationship with the search request user, thereby invoking a response to the survey from the at least one social network user;
- receiving one or more responses to the survey from the at least one other social network user, the one or more responses including input provided by the at least one other social network user through a particular social network input element of the survey; and
- displaying at least a portion of the input from the responses, or a tabulation thereof, to the search request user.

19. The method of claim 18, wherein the plurality of search result items displayed is only a portion of the search result items generated in the search result, and wherein the plurality of search result items displayed form a list, the method further comprising causing each of a plurality of the search result items in the list to be displayed with the respective associated social network input element.

20. The method of claim 18, further comprising (i) generating a social network post wherein the post includes the response or a link thereto, and (ii) associating the post with the social network user or the account of the social network user that provided the input, wherein the post is viewable by others in the social network according to permission rules associated with the account of the social network user that provided the input and the post is a non-public post.

* * * * *